May 6, 1941.   G. C. PAXTON   2,240,516

NAIL CHUCK

Original Filed Nov. 13, 1939

INVENTOR:
GERALD C. PAXTON
BY
ATTORNEY

Patented May 6, 1941

2,240,516

UNITED STATES PATENT OFFICE 2,240,516

NAIL CHUCK

Gerald C. Paxton, Riverside, Calif., assignor to Food Machinery Corporation, San Jose, Calif., a corporation of Delaware Original application November 13, 1939, Serial No. 304,162. Divided and this application June 10, 1940, Serial No. 339,679

15 Claims. (Cl. 1—5)

This invention relates to nail chucks such as are used on nailing machines for holding nails incidental to driving the latter into the work. The present application is a divisional case carved out of the copending application of W. H. Paxton, et al., Serial No. 304,162, filed November 13, 1939, for Automatic nailing machine.

Nailing machines, and particularly those used for making and lidding boxes are generally operated by unskilled labor in packing plants which are remote from centers where skilled assistance can be obtained. In these machines, a nail feeding mechanism operates to feed nails to the chucks, a single nail being ordinarily delivered to each chuck following each nailing operation. Occasionaly the feeding of more than one nail, or of a deformed nail, into one of these chucks, causes the chuck to jam and necessitates the disassembly of this chuck to enable it to again function properly.

It is an object of this invention to provide a nail chuck which may be quickly disassembled by unskilled labor for relieving a jammed condition therein and then re-assembled so that operation of the machine embodying said chuck may be resumed.

It is another object of this invention to provide a chuck which is extremely simple in design, economical in first cost and easy to repair.

Another object of the invention is the provision of a nail chuck which may be taken apart and assembled without the use of tools.

Still another object of the invention is to provide such a chuck having a minimum number of parts which need to be handled in servicing the chuck.

Other objects and advantages will become apparent in the following description of the invention in view of the accompanying drawing, in which.

Figure 1:
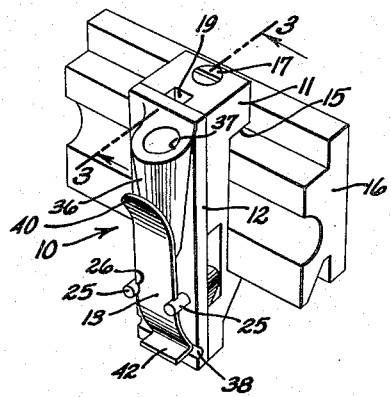
Fig. 1 is a perspective view of a preferred embodiment of nail chuck of the present invention.
Figure 3:
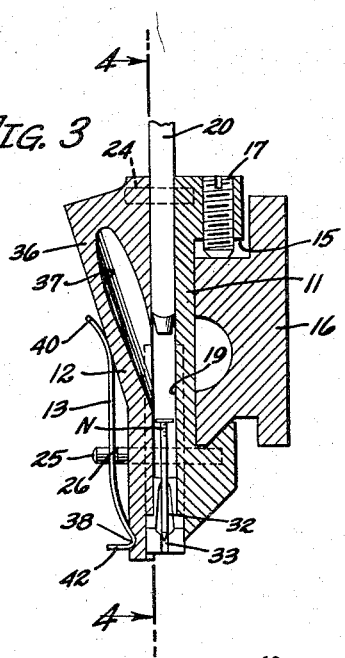
Fig. 3 is an enlarged vertical sectional view taken on the line 3—3 of Fig. 1.

Referring specifically to the drawing, a preferred form of nail chuck 10 of this invention includes a body 11, a cover 12, and a spring 13 for retaining the chuck 10 in assembled condition as shown in Figs. 1 and 3.

Figure 4:
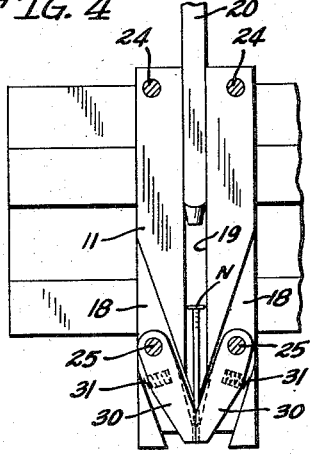
Fig. 4 is a vertical sectional view taken on the line 4—4 of Fig. 3.

The body 11 has a recess 15 formed at the rear thereof which recess is shaped as seen in Fig. 3 for receiving a mounting bar 16 provided on the nailing machine which embodies the chuck 10. The body 11 has a set screw 17 for securing it to the bar 16. Formed in the front face of the body 11 as shown in Fig. 4 is a pair of angular channels 18 and a central channel 19, the latter receiving a reciprocating nail driver 20 which is power driven in a manner well known to the art. Fixed in the body 11 are pairs of dowel pins 24 and 25, the latter having opposed notches 26 formed therein. The pins 24 and 25 are adapted to extend into suitable holes 27 and 28 provided in the cover 12, thus co-operating in aligning the cover 12 and body 11 when these are assembled.

Pivoted on the pins 25 is a pair of jaws 30 which lie in the channels 18 and are urged together by compression springs 31. Inner faces of the jaws 30 are formed as seen in Fig. 3 to provide guideways 32 and 33 for aligning and guiding a nail as the latter is driven from the chuck 10.

Figure 5:
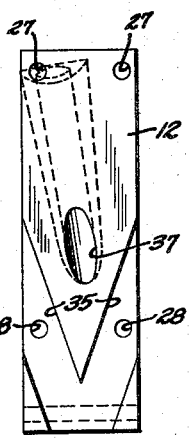
Fig. 5 is a plan view showing the inside surface of the cover portion of the chuck of this invention.

The cover 12 has shallow channels 35 on its inner face as seen in Fig. 5, these channels matching the channels 18 of the body 11. Formed integral with the cover 12 is a boss 36 having a nail delivery opening 37 extending therethrough. Extending transversely of the cover 12 is a groove 38.

Figure 6:
Fig. 6 is a side elevational view of a spring included in the present invention.

The spring 13 is preferably formed of ribbon spring steel to provide an outwardly curved upper end 40 and is bent inwardly and then outwardly at its lower end to form a detent 41 and a handle 42. When the spring 13 is in relaxed condition, the central portion of it is arched as shown in Fig. 6. The spring 13 is freely slidable in the notches 26 of the pins 25 and when positioned as seen in Figs. 1 and 3 serves to yieldably urge the cover 12 against the body 11 and is retained against displacement by engagement of the detent 41 with the groove 38. As seen in Fig. 3 a space is provided between the cover 12 and the central portion of the spring 13 to enable the cover to yield outwardly away from the body 11 to prevent breakage of the parts should the chuck 10 become jammed during operation.

For illustrative purposes, a nail N is shown in the channel 19 in Figs. 3 and 4 as this nail is normally located after delivery thereto through the passage 37 just prior to each nail driving operation. This nail is driven downwardly from the chuck 10 by being forced between the jaws 30 in advance of the downwardly reciprocating driver 20.

Figure 2:
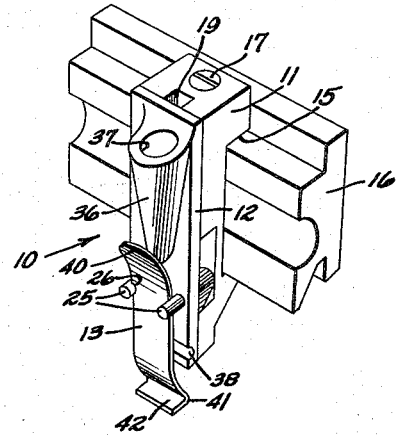
Fig. 2 is a view similar to Fig. 1 showing the manner in which the chuck is taken apart.

The cover 12 may be readily removed when the chuck becomes jammed, by grasping the handle 42, pulling the lower end of the spring 13 outwardly to dislodge the detent 41 from the groove 38, and then sliding the spring 13 downwardly in the notches 26 as shown in Fig. 2. When the spring has thus been removed, the cover 12 is free to be slipped outwardly off of the pins 25, thereby exposing to view the interior of the chuck 10 substantially as this may be seen in Fig. 4. Complete access is thus given to the chuck for removing any nails jammed therein.

These nails are usually forced in between the chuck jaws 30, and if the jaws 30 should be thus swung apart to where they contact the outer faces of the channels 18, the jaws can be slid outwardly on the pins 25 to permit them to be farther separated, thereby easily freeing the jamming matter from between the jaws. When the chuck has thus been cleaned out, the jaws may be replaced in their normal positions in the channels 18 as shown in Fig. 4, by rocking these together, compressing the springs 31 in their recesses provided in the jaws 30, and then sliding the latter along the pins 25 into these channels. The cover 12 may now be re-assembled with the body 11 by slipping the cover over the pins 25 with the latter extending through the holes 28 and permitting the pins 24 to enter the holes 27. The cover is then retained in reassembled position by inserting the upper end of the spring 13 between the pins 25 so that the edges of the spring slide through the notches 26 and then pushing on the handle 42 axially of the spring 13 until the detent 41 snaps into the groove 38.

From the foregoing description, it is believed evident that I have produced, in the present invention, a nail chuck for a nailing machine which is extremely simple in construction, which has relatively few parts, and which can be readily disassembled, cleaned out, and re-assembled by an unskilled worker.

I claim as my invention:

1. In a nail chuck for use in a nailing machine, the combination of: a body having a nail receiving channel formed therein; a nail driving punch slidable in said channel for driving said nail from said chuck into a piece of work; a removable cover plate on said body to close said channel; and a spring for yieldably retaining said cover plate on said body, said spring being slidable into and out of retaining relation to said plate.

2. In a nail chuck for use in a nailing machine, the combination of: a body having a nail receiving channel formed therein; a nail driving punch slidable in said channel for driving said nail from said chuck into a piece of work; a removable cover plate on said body to close said channel; a spring for yieldably retaining said cover plate on said body; means on said body for supporting said spring in retaining relation with said plate; and means on said plate for yieldably retaining said spring against removal from said plate.

3. In a nail chuck for use in a nailing machine, the combination of: a body having a nail receiving channel formed therein; a nail driving punch slidable in said channel for driving said nail from said chuck into a piece of work; a removable cover plate on said body to close said channel; a pair of spaced pins fixed on said body and extending beyond the outer surface of said plate; a spring removably positioned on said plate between said pins; and means formed on said pins for urging said spring against said plate to retain said plate yieldably on said body.

4. In a nail chuck for use in a nailing machine, the combination of: a body formed to provide a nail receiving channel therein; a pair of pivoted jaws in said body for guiding nails as the latter are driven from said chuck; a cover plate on said body; a pair of pins fixed on said body and extending through said plate, said jaws being pivoted on said pins; a leaf spring removably positioned between said pins; and means formed on said pins for urging said spring against the outer surface of said plate to retain said plate yieldably on said body.

5. In a nail chuck for use in a nailing machine, the combination of: a body formed to provide a nail receiving channel therein; a pair of pivoted jaws in said body for guiding nails as the latter are driven from said chuck; a cover plate on said body; a pair of pins fixed on said body and extending through said plate, said jaws being pivoted on said pins; a leaf spring removably positioned between said pins; means formed on said pins for urging said spring against the outer surface of said plate to retain said plate yieldably on said body; and means formed on said plate for yieldably retaining said spring in operative position between said pins.

6. In a nail chuck for use in a nailing machine, the combination of: a body having a nail receiving channel formed in one face thereof; a nail driving punch slidable in said channel for driving a nail from said channel into a piece of work disposed adjacent the nail discharging end of said body, said body being formed to provide a diagonally disposed channel on each side of said nail receiving channel, said diagonal channels converging into communication with said nail receiving channel adjacent the nail discharging end of said body; a pivoted jaw in each of said diagonal channels, said jaws being disposed with the free ends thereof in contact to engage and guide a nail as said nail is being driven from said chuck; means for yieldably urging said jaws into contact; and a cover plate yieldably held on said body for closing the open sides of said nail receiving and said diagonal channels.

7. A combination as in claim 6, in which said cover plate is yieldably retained on said body by a spring slidable into and out of retaining relation with said plate.

8. In a nail chuck for use in a nailing machine, the combination of: a body having a nail receiving channel formed in one face thereof; a nail driving punch slidable in said channel for driving a nail from said channel into a piece of work disposed adjacent the nail discharging end of said body, said body being formed to provide a diagonally disposed channel on each side of said nail receiving channel, said diagonal channels converging into communication with said nail receiving channel adjacent the nail discharging end of said body; a pivoted jaw in each of said diagonal channels, said jaw being disposed with the free ends thereof in contact to engage and guide a nail as said nail is being driven from said chuck; means for yieldably urging said jaws into contact; a cover plate on said body for closing said diagonal and said nail receiving channels; a spring for yieldably retaining said cover plate on said body; means on said body for supporting said spring in retaining relation with said plate; and means on said plate for yieldably retaining said spring against removal from said plate.

9. In a nail chuck for use in a nailing machine, the combination of: a body having a nail receiving channel formed in one face thereof; a nail driving punch slidable in said channel for driving a nail from said channel into a piece of work disposed adjacent the nail discharging end of said body, said body being formed to provide a diagonally disposed channel on each side of said nail receiving channel, said diagonal channels converging into communication with said nail receiving channel adjacent the nail discharging end of said body; a pin fixed in each of said diagonal channels; a jaw pivoted on each of said pins, the free ends of said jaws being urged into contact to engage and guide a nail as said nail is being driven from said chuck; a cover plate on said body for closing the open sides of said nail receiving and said diagonal channels, said pins extending through said cover plates; and a leaf spring for yieldably retaining said cover plate on said body, said spring being held in retaining relation to said cover plate by said pins.

10. In a nail chuck for use in a nailing machine, the combination of: a body having a nail receiving bore extending therethrough; means for delivering a nail to said bore; a nail driving punch slidable in said bore for driving said nail from said bore into a piece of work pressed against the nail discharge end of said body; a pair of pivoted jaws in said body, free ends of said jaws being disposed in contact to receive and guide said nail as said nail is driven from said body; and means for yieldably urging said jaws toward each other, the free ends of said jaws being disposed within and in spaced relation with the nail discharge end of said body to permit free movement of said jaws when said body is pressed against said work.

11. A nail chuck comprising a body and a cover, said chuck having a nail receiving cavity formed between said body and said cover; yieldable means for retaining a nail in said cavity; a nail driver reciprocable in said chuck for driving said nail from said cavity into a piece of work; a spring formed of flat material; and spring retaining means extending from said body beyond said cover for retaining said spring in position on said cover to urge said cover against said body, said spring being slidable into and out of engagement with said retaining means to permit rapid assembly or disassembly of the cover and body of said chuck.

12. A nail chuck comprising a body and a cover, said chuck having a nail receiving cavity formed between said body and said cover; yieldable means for retaining a nail in said cavity; a nail driver reciprocable in said chuck for driving said nail from said cavity into a piece of work; a spring formed of flat material, said spring being bent so that end portions thereof contact said cover; and retaining means extending from said body and engaging the center portion of said spring to retain the latter in position to urge said cover against said body, said spring being slidable into and out of engagement with said retaining means, said cover being formed to provide a recess for receiving one end of said spring to retain the latter against accidental displacement from said cover.

13. A nail chuck comprising a body and a cover, said chuck having a nail receiving cavity formed between said body and cover; yieldable means for retaining a nail in said cavity; a nail driver reciprocable in said chuck for driving said nail from said cavity into a piece of work; a pair of spaced pins fixed on said body and extending beyond said cover, the portions of said pins disposed beyond said cover being formed to provide channels extending transversely of the axes of said pins; and a spring formed of flat material and slidably received between said pins by said channels, opposite ends of said spring pressing against said cover to yieldably retain the latter against said body.

14. A nail chuck comprising a body and a cover, said chuck having a nail receiving cavity formed between said body and said cover; yieldable means for retaining a nail in said cavity; a nail driver reciprocable in said chuck for driving said nail from said cavity into a piece of work; a spring formed of flat material; and spring retaining means extending from said body beyond said cover for retaining said spring in position on said cover to urge said cover against said body, said spring being slidable into and out of engagement with said retaining means to permit rapid assembly or disassembly of the cover and body of said chuck, said cover being formed to provide a recess for receiving an end of said spring to retain said spring against accidental displacement.

15. A nail chuck comprising a body and a cover, said chuck having a nail receiving cavity formed between said body and cover; yieldable means for retaining a nail in said cavity; a nail driver reciprocable in said chuck for driving said nail from said cavity into a piece of work; a pair of spaced parallel pins fixed on said body and extending through and beyond said cover, said pins serving to align said cover with said body and to permit movement of said cover toward and away from said body; a spring formed of flat material and slidable between said pins, said spring shaped so that end portions thereof engage said cover with the center portion spaced from said cover; shoulder means formed on said pins to engage said center portion and retain said spring with said end portions urging said cover against said body; and means for locking said spring against accidental displacement from said cover.

GERALD C. PAXTON.